United States Patent [19]

Kawakami et al.

[11] Patent Number: 4,746,191

[45] Date of Patent: May 24, 1988

[54] OPTICAL SWITCH

[75] Inventors: Shojiro Kawakami; Makoto Minakata, both of Sendai; Mitsuhiro Takata; Sachio Toyota, both of Mishima, all of Japan

[73] Assignee: Sumitomo Special Metal Co., Ltd., Osaka, Japan

[21] Appl. No.: 71,135

[22] Filed: Jul. 8, 1987

[30] Foreign Application Priority Data

Jul. 11, 1986 [JP] Japan .................................. 61-164491

[51] Int. Cl.$^4$ .................................................. G02B 6/16
[52] U.S. Cl. ............................... 350/96.29; 350/96.15; 350/96.20
[58] Field of Search ............... 350/96.29, 96.30, 96.20, 350/96.15, 96.10

[56] References Cited

U.S. PATENT DOCUMENTS

| | | | |
|---|---|---|---|
| 3,756,690 | 9/1973 | Borrelli et al. | 350/96.29 |
| 3,770,339 | 11/1973 | Ramaswamy | 350/96.29 |
| 4,630,889 | 12/1986 | Hicks, Jr. | 350/96.30 |

FOREIGN PATENT DOCUMENTS

| | | | |
|---|---|---|---|
| 0049916 | 3/1983 | Japan | 350/96.20 |
| 0044110 | 3/1983 | Japan | 350/96.30 |
| 6039630 | 8/1983 | Japan . | |
| 6097304 | 11/1983 | Japan . | |

Primary Examiner—James W. Davie
Attorney, Agent, or Firm—Watson, Cole, Grindle & Watson

[57] ABSTRACT

There is disclosed an optical switch comprising an optical fiber, a block of PLZT, and two polarizers disposed on opposite sides of the block. The fiber has one or more grooves in which the block and the polarizers are received. The block of PLZT induces an electric field perpendicular to the axis of the core of the fiber. The groove or grooves extend across the core of the fiber such that the block covers the whole cross section of the core. Each polarizer consists of alternate laminations of a metal and a dielectric. The laminations are stacked in a direction perpendicular to the axis of the core. Each dielectric lamination is thicker than each metal lamination. If incident light is polarized, one of the polarizers is omitted.

11 Claims, 2 Drawing Sheets

OPTICAL SWITCH

FIELD OF THE INVENTION

The present invention relates to an optical switch which is used in optical transmission, information processing, and instrumentation applications to cut off the incidence of light on an optical transmission path, select one out of some light beams, switch one light to another, or modulate light. More specifically, the invention relates to an optical switch in which one or two polarizers and a block of PLZT acting as an electric field-inducing wavelength plate are arranged. This switch is best suited to small-sized and high-performance transmission systems using optical fiber. This switch can be operated at a low voltage, can achieve a high switching speed, and allows miniaturization of equipment.

BACKGROUND OF THE INVENTION

Fiber-optic transmission systems prevail in optical transmission circuits used in optical communication, for example. The performance of an optical transmission circuit depends much on the structure and the performance of an optical switch that is indispensable for the optical transmission circuit. Therefore, various optical switch structures have been developed.

Presently, a mechanical optical switch in which a optical fiber or prism is mechanically moved to switch from one state to another is put into practical use. However, this mechanical optical switch has numerous problems. That is, the switching speed is low. The optical axes of descrete components are required to be aligned. Further, it is bulky and vulnerable to vibration.

Japanese Patent Laid-Open No. 39,630/1985 has disclosed an optical switch having no movable portion. Specifically, this switch has a polarizing splitter consisting of a beam splitter and a total reflection prism. Incident light is caused to enter this polarizing splitter, and then the divided light beams are made to enter respectively PLZT (lead lanthanum zirconate titanatae) forming grooved electrodes. The beams are then transmitted through a summing polarizer consisting of a beam splitter and a total reflection prism, and an output light beam exits from this summing polarizer. A signal voltage is applied between the grooved electrodes to provide switching action. Namely, this switch utilizes electrooptic effects.

It is claimed that this optical switch operates at a voltage of 80 to 100 V, and exhibits high performance including a switching speed of 1 $\mu$s (1 Mhz) and an insertion loss of 1.4 dB. However, the components are arranged in a complicated manner, because light going out of an optical fiber passes through a lens, the polarizing splitter, an electric field-inducing wavelength plate made from PLZT, the summing polarizer, and a lens, and then the light reenters the optical fiber. Since the light travels through air between the components, a large reflection loss occurs and misalignment of optical axes also causes a large loss so that a large insertion loss takes place. In addition, complex grooved electrodes made from PLZT must be used. This makes it difficult to simplify the structure of the optical transmission circuit, to miniaturize the circuit, and to mass-produce it. Furthermore, this switch cannot achieve higher switching speeds which would be required in the future.

Another optical switch that operates at a low voltage, i.e., several voltage, and has a high switching speed of 1 GHz has been proposed. This switch has a waveguide made from $LiNbO_3$. However, this switch also has several problems. Specifically, the insertion loss is as large as several dB. It is difficult to manufacture the switch.

As described above, the conventional optical circuit components are much larger in size than optical fibers through which signals are transmitted. Further, an optical fiber in a transmission circuit is required to be divided to install these components. The division of the fiber necessarily leads to an increase in the insertion loss. Accordingly, an optical switch which takes the form of an optical fiber, i.e., assumes an ideal form as an optical circuit element used for fiber-optic transmission system, has been required to be developed.

SUMMARY OF THE INVENTION

It is an object of the invention to provide an optical switch having a novel structure and used in a fiber-optic transmission circuit.

It is another object of the invention to provide an optical switch which can operate at a low voltage and provide a quite high switching speed.

It is a further object of the invention to provide an optical switch which is best suited to miniaturization and simplification of an optic-fiber transmission circuit.

In an attempt to obtain an optical switch which has a high switching speed and can operate at a low voltage, the present inventor has examined various materials and structures and noticed PLZT (lead lanthanum zirconate titanate) which is a transparent, high-density, ceramic electrooptical material. PLZT has a much larger electrooptic constant than $LiNbO_3$ or other electrooptical materials. The present inventor has found that an electric field-inducing wavelength plate inserted in an optical fiber can be obtained by placing a specially shaped quite small block of PLZT in an optical fiber in a certain angular position. This field-inducing wavelength plate produces no misalignment of optical axes, introduces a minimum insertion loss, permits low-voltage operation, has a high speed of response, and allows a transmission circuit to be manufactured in quite small size. Additionally, a fiber-type optical switch can be obtained by combining this plate with a minute polarizer as already proposed by the present inventor in Japanese Patent Laid-Open No. 97,304/1985. This fiber-type optical switch entirely dispenses with an optical lens or the like arranged between optical fibers. The novel switch made by the inventor can operate at a low voltage and has a quite high switching speed.

In summary, the present invention resides in an optical switch comprising: an optical fiber; a groove formed in the fiber and extending across the core of the fiber; a block of PLZT disposed in the groove so as to cover the whole cross section of the core and to interconnect the divided portions of the core, the block constituting an electric field-inducing wavelength plate for inducing an electric field which is perpendicular to the axis of the core; and one or two polarizers disposed close to or in contact with one or both end surfaces of the electric field-inducing wavelength plate which extend at right angles to the axis of the core, each polarizer at least covering the whole cross section of the core, each polarizer consisting of alternate laminations of a metal and a dielectric. The laminations are stacked in a direction perpendicular to the axis of the core. The dielectric laminations are thicker than the metal laminations.

Other objects and features of the invention will appear in the course of the description thereof which follows.

DETAILED DESCRIPTION OF THE INVENTION

Figure 1:
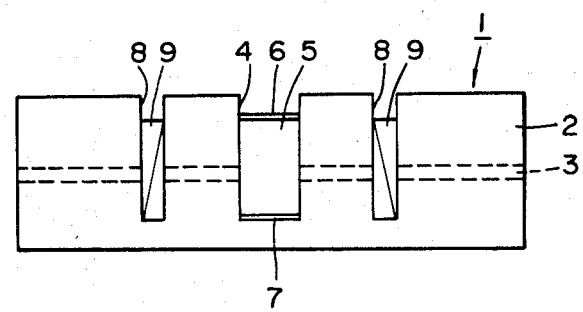
FIG. 1 is a front elevation of an optical switch according to the invention.

An optical switch embodying the concept of the present invention has an electric field-inducing wavelength plate made from PLZT and one or two polarizers. Preferably, the plate and the polarizer or polarizers are inserted in an optical fiber or placed in one or more grooves formed in the fiber. The grooves have given widths in the axial direction, and are so sized that the number of diffractions of light is not limited. The grooves extend through one side of the clad and the core and terminate in the other side of the clad as viewed in a cross section of the switch. It is also possible to place them between a pair of optical fibers such that they are in contact with the end surfaces of the fibers. The grooves can be mechanically formed, using a sharp cutter. Microlapping, ion polishing, or other techniques may also be employed.

The field-inducing wavelength plate of PLZT and the polarizer or polarizers can be disposed variously. For example, polarizers are placed in contact with both end surfaces of the field-inducing wavelength plate. The block of PLZT and the polarizers are placed in a fiber at given intervals. They are angularly displaced from each other according to the required mode of propagation or switching action. Also, they are arranged, taking account of the direction of the electric field induced by the field-inducing wavelength plate of PLZT and the direction in which the films of each polarizer are stacked on top of each other. Either a single-mode optical switch or a multi-mode optical switch can be fabricated by appropriately selecting the kind of optical fiber, the shape of the field-inducing wavelength plate, the shape of the polarizers, and their arrangement. Where the incident light has been already polarized, only one polarizer is used. Where it is not polarized, a pair of polarizers is employed.

The shape and the dimensions of the field-inducing wavelength plate of PLZT are selected, taking account of the kind of optical fiber, the dimensions of the core and the clad, the wavelength of the incident light, the actuating voltage, the diffraction loss, and other factors. It is necessary that the plate of PLZT cover the whole cross section of the core. It is also necessary that the direction of the induced electric field be perpendicular to the axis of the core in order that, when a voltage is applied between the electrodes on the plate of PLZT, the plane of polarization of the light passing through the plate is rotated through 90°.

Usually, the electrodes are formed on the opposite surfaces of the field-inducing wavelength plate of PLZT which are not in contact with the core. However, any other known arrangement of electrodes may also be adopted, as long as the direction of the electric field is perpendicular to the axis of the core. If the distance between the electrodes as measured in the direction of the electric field is made too large, then a higher actuating voltage is needed with undesirable results. Also, increasing the distance between the electrodes increases the dimensions of the field-inducing wavelength plate, and hence this plate protrudes from the optical fiber. This is unfit for the purpose of miniaturization. Shaping and sizing the plate of PLZT so as to be capable of being inserted in an optical fiber contributes to a reduction in the actuating voltage and miniaturization. In addition, the electrostatic capacity of the plate of PLZT is minimized.

The composition of normally used PLZT is indicated by 9/65/35. That is, Pb is doped with La of 9 atomic %, and the ratio of Zr to Ti is 65:35. However, the invention is not restricted to this composition. The ratios of Pb, La, Zr, Ti can be changed according to the required characteristics. Also, other element may be added to the material. Preferably, the composition is appropriately selected out of known compositions of PLZT.

The polarizer or polarizers are fabricated by alternately stacking thin films of Al, Au, Ag, Cu, or other metal and thin dielectric films of $SiO_2$ or other dielectric which are thicker than the metal films. These films are formed by sputtering, evaporation, or other technique. It is desired that the dielectric films have substantially the same dielectric constant as that of the core of the optical fiber and be transparent to light. Only the component of light incident on the polarizer which has an electric field vector perpendicular to the direction in which the thin films are stacked is allowed to exit from the polarizer. The thickness of the thin metal films ranges approximately from 20 to 100 Å. The thickness of the thin dielectric films ranges roughly from 3000 to 10,000 Å. These thicknesses are appropriately set according to the characteristics of polarization, such as extinction ratio and insertion loss, which are required for the polarizer.

The polarizer is required to be large enough to cover at least the whole cross section of the core to perform the aforementioned purposes. In order to constitute a fiber-type optical switch, it is desired that the maximum diameter be equal to the outside diameter of the clad. The dimensions of the polarizer are suitably selected, considering the ease with which it is attached to a fiber and also the ease with which the switch is fabricated. Of the various conditions imposed on the block of PLZT and the polarizer, their thicknesses along the axis of the fiber greatly affect the insertion loss and other factors and determine the properties of the optical switch. Therefore, these thicknesses are preferably determined according to the Examples described below.

Figure 2:
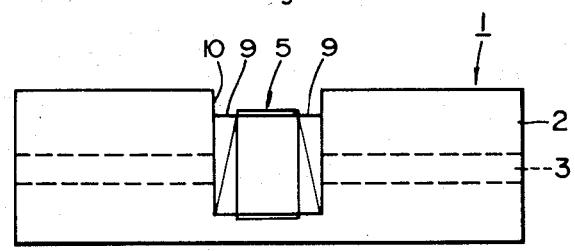
FIG. 2 is a front elevation of another optical switch according to the invention.
Figure 3:
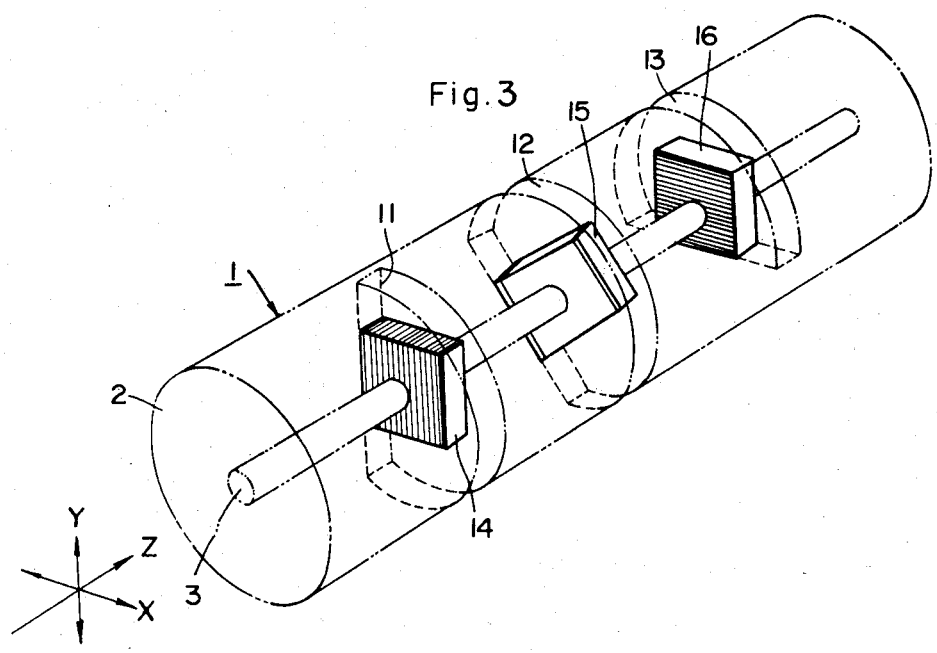
FIG. 3 is a perspective view of a further optical switch according to the invention.

Referring to FIGS. 1, 2, and 3, there are shown optical switches according to the invention. An optical fiber, generally indicated by reference numeral 1, comprises a clad 2 of an outside diameter $D_1$ and a core 3 of a diameter $D_2$. The clad 2 surrounds the core 3 coaxially. The fiber 1 is provided with one or more grooves. Each groove is formed by cutting out a semicylindrical portion from the fiber 1 and so the bottom of the groove is flat. As viewed in a cross section, the groove starts from one side of the outer periphery of the clad 2, extends through the core 3, and terminates in a location within the clad 2 on the other side.

Referring specifically to FIG. 1, a rectangular parallelopiped 5 of PLZT is fitted in a groove 4. Electrodes 6 and 7 are mounted on opposite surfaces of the block 5. The electrodes 6 and 7 are spaced from each other in the direction of depth of the groove 4. One electrode 7 is in contact with the bottom of the groove 4. A pair of grooves 8 is formed at locations which are equally spaced from the block 5 of PLZT. Polarizers 9 are disposed in the grooves 8, respectively. Each polarizer 9 has thin films which are stacked in a given direction. Thus, a novel optical switch is completed. The block 5 of PLZT and the polarizers 9 which are inserted in the grooves 4 and 8, respectively, totally cover the cross section of the core 3.

Referring next to FIG. 2, the optical fiber 1 has one groove 10 in which two polarizers 9 and one rectangular parallelopiped 5 of PLZT are disposed. The polarizers 9 are disposed on opposite sides of the block 5 of PLZT. The block 5 and the polarizers 9 have the same phase relationship as the block 5 and the polarizers 9 shown in FIG. 1, but the polarizers 9 are in contact with the end surfaces of the block 5 that extend at right angles to the axis of the core 3.

Referring next to FIG. 3, the optical fiber 1 is provided with three grooves 11, 12, 13 which are equally spaced from each other. The groove 11 located at the front position as viewed in the figure extends vertically. The grooves 12 and 13 are angularly displaced by 45° from the grooves 11 and 12, respectively. Therefore, the rear groove 13 is displaced by 90° from the front groove 11. A polarizer 14, a block 15 of PLZT, and another polarizer 16 are disposed in the grooves 11, 12, 13, respectively. Each of the polarizers 14 and 16 is formed by stacking thin films of aluminum and thin dielectric films of $SiO_2$ alternately on the bottom of the groove 11 or 13. The direction in which the thin films of the polarizer 14 are stacked is displaced by 90° from the direction in which the thin films of the polarizer 16 are stacked. The block 15 of PLZT is so disposed in the central groove 12 that the induced electric field lies in the direction of depth of the groove, in order that one of the electrodes on the block be in contact with the bottom of the groove. The direction of the electric field induced by the block 15 of PLZT is angularly displaced by 45° from the directions in which the thin films are stacked in the polarizers 14 and 16.

The optical switch shown in FIG. 3 and constructed as described above operates in the manner described now. A light beam enters the core 3 of the optical fiber 1 in the direction Z in FIG. 3 ad arrives at the front polarizer 14. Then, only the component of the light which has an electric field vector lying in the horizontal direction X in FIG. 3 is transmitted through the polarizer 14 and reaches the block 15 of PLZT. As a half-wave voltage is applied between teh electrodes on the block 15, the electric field vector in the horizontal direction X is rotated by 90° by means of the block 15 so that the electric field vector is in the vertical direction Y. The light transmitted through the blcok 15 reaches the rear polarizer 16, which allows the incident light to pass through it, because the polarizer 16 allows only the light having an electric field vector in the vertical direction Y to be transmitted.

Thus, the optical switch shown in FIG. 3 opens the optical transmission path when an actuating voltage is applied to the block 15 of PLZT. If the direction in which the thin films of the polarizer 14 are stacked is made coincident with the direction in which the thin films of the polarizer 16 are stacked, then the optical switch blocks the optical transmission path. Where the incident light beam has been already polarized, the front polarizer 11 can be omitted as described already.

EXAMPLE 1

Figure 4:
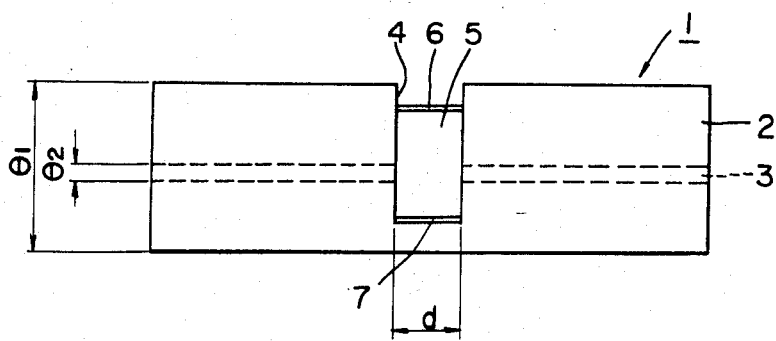
FIG. 4 is a front elevation of an electric field-inducing plate made from PLZT and inserted in an optical fiber.
Figure 5:
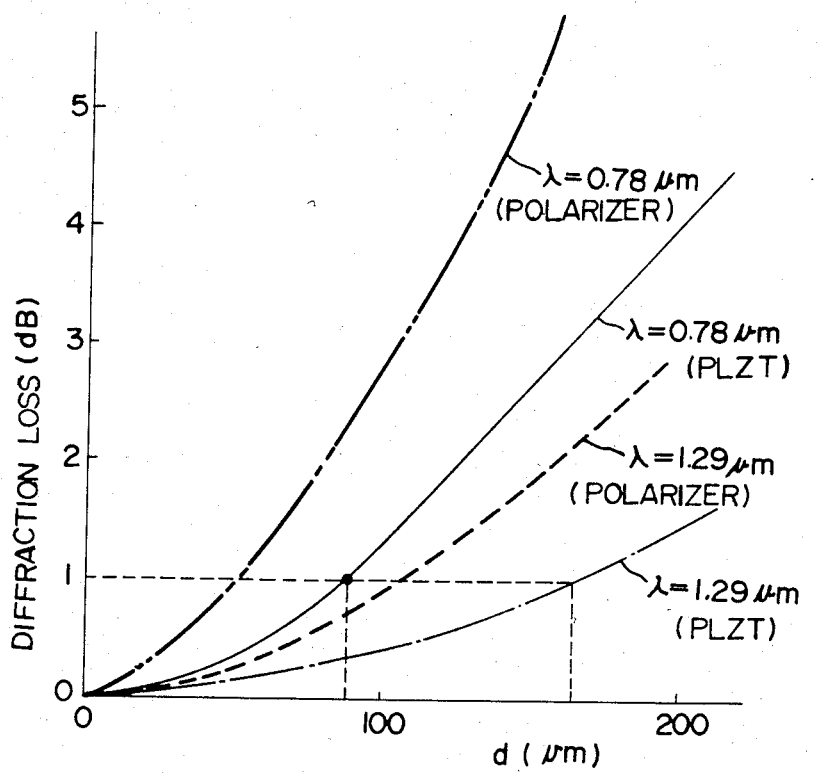
FIG. 5 is a graph in which the diffraction losses of polarizers and blocks of PLZT are plotted against their thicknesses along the axis of the optical fiber in which they are inserted.

Noting that the thickness of a block of PLZT placed in an optical fiber greatly affects the diffraction loss caused by the block, the present inventor investigated the relation between the thickness d along the axis of the fiber and the diffraction loss. Referring to FIG. 4, a semicylindrical groove 4 was formed in an optical fiber 1. A rectangular parallelopiped 5 of PLZT having electrodes 6 and 7 on its opposite surfaces was fitted in the groove 4. Thus, an electric field-inducing wavelength plate inserted in the optical fiber was fabricated. The used fiber was a single-mode optical fiber having an outside diameter $D_1$ of 125 μm. The diameter of the core was 10 μm. The rectangular parallelopiped had a width W of 20 μm and a height h of 20 μm, and was made from PLZT whose composition was given by 9/65/35 as mentioned above. The refractive index n of this parallelopiped was 2.5. The thickness d of the block was gradually changed. The results are shown in the graph of FIG. 5. The light beams incident on the fiber had wavelengths of 0.78 μm and 1.29 μm, and were emitted by semiconductor lasers. It can be seen from the graph of FIG. 5 that when the wavelength of the incident light is 0.78 μm, the thickness d of the block of PLZT is required to be less than 90 μm to reduce the diffraction loss of the optical circuit below 1 dB. The solid line indicates the characteristic of the block of PLZT obtained when the wavelength was 0.78 μm. When the wavelength of the incident light is 1.29 μm, the thickness d of the block is required to be less than 160 μm. The dot-and-dash line indicates the characteristic of the block when the wavelength was 1.29 μm.

EXAMPLE 2

Example 2 was similar to Example 1 except that a polarizer formed by alternately stacking thin films of aluminum having a thickness of 40 Å and thin dielectric films of $SiO_2$ having a thickness of 6500 Å was used instead of the block of PLZT. The phantom line indicates the characteristic of the polarizer when the incident light had a wavelength of 0.78 μm. The broken line indicates the characteristic of the polarizer when the incident light had a wavelength of 1.29 μm. It can be seen also from the graph of FIG. 5 that when the wavelength is 0.78 μm, it is necessary that the thickness d of the polarizer along the axis of the optical fiber be less than 60 μm, in order to suppress the diffraction loss within 1 dB. When the wavelength is 1.29 μm, the thickness is required to be less than 100 μm for the same purpose. When the wavelength of the incident light was 0.78 μm, the thickness of the polarizer was required to be larger than 10 μm to make the extinction ratio greater than 30 dB. When the wavelength was 1.29 μm, the thickness was required to be larger than 35 μm for the same purpose. As described above, it is necessary to determine the thickness of the polarizer, taking account of the diffraction loss and the extinction ratio, and according to the required characteristics of the optical switch.

EXAMPLE 3

An optical switch as shown in FIG. 3 was fabricated. The thicknesses of the block of PLZT and the polarizers were selected according to Example 1. The fiber was a single-mode optical fiber having a diameter $D_1$ of 125 μm. The diameter $D_2$ of the core was 10 μm. The thickness of the block was 30 μm, and the block was made from PLZT having a composition given by 9/65/35 as described above. The polarizers were fabricated by alternately stacking aluminum films of 40 Å thick and dielectric films of $SiO_2$ of 6500 Å thick. The thickness of the polarizers along the axis of the optical fiber was 10 μm. The polarizers were disposed in the fiber together with the block of PLZT. A semiconductor laser was used to produce light of wavelength 0.78 μm. The optical switch was illuminated with this light, and the characteristics of the switch were measured. When the actuating voltage was 20 V, a switching speed of 0.1 μs, an insertion loss of 1.0 dB, and an extinction ratio of 30 dB were obtained.

What is claimed is:

1. An optical switch comprising:
    an optical fiber;
    a groove formed in the fiber and extending across the core of the fiber;
    a block of PLZT disposed in the groove so as to cover the whole cross section of the core and to interconnect the divided portions of the core, the block constituting an electric field-inducing wavelength plate for inducing an electric field which is perpendicular to the axis of the core; and
    one or two polarizers disposed close to or in contact with one or both end surfaces of the electric field-inducing wavelength plate which extend at right angles to the axis of the core, each polarizer at least covering the whole cross section of the core, each polarizer consisting of alternate laminations of a metal and a dielectric, the laminations being stacked in a direction perpendicular to the axis of the core, each dielectric lamination being thicker than each metal lamination.

2. The optical switch of claim 1, wherein the PLZT has a composition given by La/Zr/Ti=9/65/35.

3. The optical switch of claim 1, wherein each metal lamination of each polarizer is made of a thin film of aluminum, and wherein each dielectric lamination is made of a film of $SiO_2$.

4. The optical switch of claim 3, wherein
    the film of aluminum has a thickness of 20 to 100 Å, and wherein the film of $SiO_2$ has a thickness of 3000 to 10,000 Å.

5. The optical switch of claim 1, wherein two polarizers are disposed on opposite sides of the block of PLZT, and wherein the direction in which the laminations are stacked in the polarizer disposed on the incident side of the block is displaced by 45° from the direction of the electric field induced by the block.

6. The optical switch of claim 5, wherein the direction in which the laminations are stacked in one of the polarizers is displaced by 90° from the direction in which the laminations are stacked in the other polarizer.

7. The optical switch of claim 5, wherein the direction in which the laminations of one polarizer are stacked is coincident with the direction in which the laminations of the other polarizer are stacked.

8. The optical switch of claim 1, wherein the thickness of the block of PLZT and the thickness of the polarizers along the axis of the optical fiber are so set that the diffraction loss caused by the switch is less than 1 dB.

9. The optical switch of claim 8, wherein the thickness of the block of PLZT is less than 90 μm, and wherein the thickness of the polarizers is less than 60 μm.

10. The optical switch of claim 8, wherein
    the thickness of the block of PLZT is less than 160 μm, and wherein the thickness of the polarizers is less than 100 μm.

11. The optical switch of claim 1, wherein the block of PLZT and the polarizers are inserted in the optical fiber.

* * * * *